United States Patent [19]

Anderson et al.

[11] 3,739,557
[45] June 19, 1973

[54] BAG FILTER ARRANGEMENT

[75] Inventors: William M. Anderson; Ronald J. Renko, both of Wellsville, N.Y.

[73] Assignee: The Air Preheater Company, Inc., Wellsville, N.Y.

[22] Filed: Dec. 20, 1971

[21] Appl. No.: 209,806

[52] U.S. Cl. ................. 55/302, 55/319, 55/341
[51] Int. Cl. ........................................ B01d 46/04
[58] Field of Search .......... 55/301–305, 319, 341, 361–382, 418, 424

[56] References Cited
UNITED STATES PATENTS

| | | | |
|---|---|---|---|
| 1,743,934 | 1/1930 | Ruemelin | 55/341 X |
| 3,385,033 | 5/1968 | Basore et al. | 55/341 X |
| 3,499,268 | 3/1970 | Pausch | 55/341 X |
| 3,513,638 | 5/1970 | Young | 55/341 X |
| 3,577,704 | 5/1971 | Sharlit | 55/304 |
| 3,699,750 | 10/1972 | Nepereny | 55/341 X |

Primary Examiner—Frank W. Lutter
Assistant Examiner—Vincent Gifford
Attorney—Wayne H. Lang and Eldon H. Luther

[57] ABSTRACT

A bag filter apparatus that removes entrained particulate matter from a carrier gas stream is disclosed. The bag filter has a novel flow arrangement that provides for a sudden expansion of the carrier gas to thereby lower its velocity and thus reduce its capacity to carry particulate matter while it precludes direct impingement of entrained particulate matter upon the fabric filter bags to reduce abrasion of the fabric. The flow arrangement defined also increases the collecting efficiency of the filter bag by eliminating the re-entrainment of filtered dust in the gas stream after it has been once removed therefrom.

5 Claims, 1 Drawing Figure

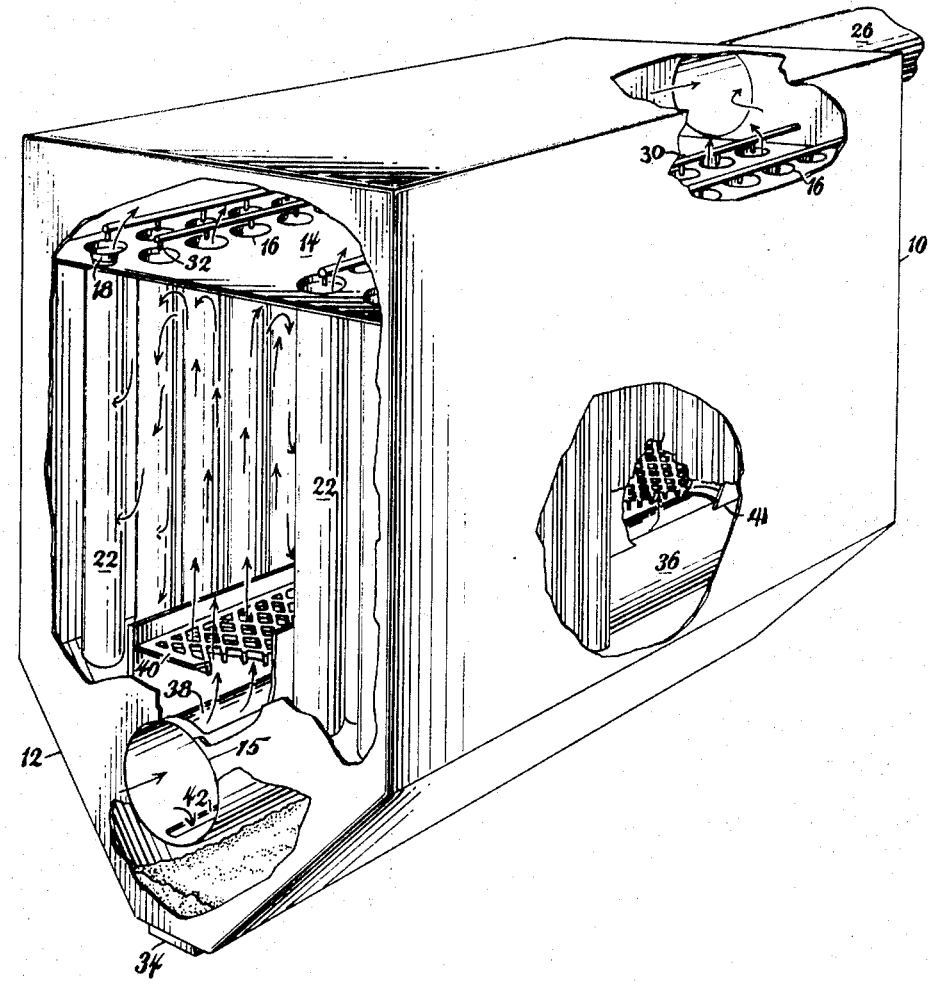

BAG FILTER ARRANGEMENT

BACKGROUND OF THE INVENTION

1. Field of the Invention

This invention relates to porous filtering devices for removing particulate matter from a dirty gas stream in which the filtering device comprises a tubular filter bag directly exposed to a stream of dirty gas while a cleaning means is provided for removing accumulated dust deposits from the filtering surfaces of the filter. Usually the bag cleaning means comprises apparatus that sets up a momentary back pressure to cause reverse fluid flow within the filter bags and thus to remove accumulated dust from the outer surface thereof. As the back pressure subsides, the dust particles dislodged from the filter bags frequently are re-entrained in the oppositely flowing dirty gas stream to be again subjected to the filtering action and deposited on the surface of the filter. The filter elements thus are forced to repeatedly remove the same particles from the gas stream whereby such elements become inefficient and worn with use and cleaning becomes a slow operation.

SUMMARY OF THE INVENTION

The present invention comprises a bag filter arrangement through which dust entrained gases are directed to remove the dust particles from the gas. The bag filtering units are arranged in longitudinal banks laterally adjacent a horizontal inlet duct carrying a stream of dust entrained gas. The gas is exhausted upward from an elongate opening in the inlet duct and is turned downward by the underside of a horizontal tube sheet. Quantities of agglomerated "dust cake" being removed from the filtering units fall downward in the same direction as the circulating inlet gas stream so that said dust is not re-entrained in the incoming gas and again deposited on the surface of the filter. The inlet duct for dust entrained gas is moreover designed to provide a sudden increase in volume whereby the gas with dust entrained therein expands rapidly after exhausting from an elongated slot, whereupon it loses velocity to drop a portion of the heavier particles entrained therein into a subjacent collection hopper. A perforate service walkway is provided above the elongate opening in the inlet duct to utilize available space for service and repair, and to provide an even pressure distribution throughout the housing by producing a slight pressure drop thereto.

BRIEF DESCRIPTION OF THE DRAWING

The single FIGURE is a perspective elevation, partially broken away to show a filter arrangement according to the present invention.

DESCRIPTION OF THE PREFERRED EMBODIMENTS

In the present invention a housing is formed with a rectangular main filter section 10 and a hopper section 12 subjacent thereto. The main housing 10 includes a transverse tube sheet 14 dividing the housing into a filter chamber and a clean gas outlet chamber. The tube sheet has a series of apertures 16 with aligned collars 18, each of which provides a clamping base for a perforate filter bag 22. An inlet port 15 for dust entrained gas enters laterally into the hopper and an outlet 26 for clean gas is connected to the upper part of the housing to exhaust clean gas therefrom.

In order that reversely flowing air is provided to remove the filtered dust particles from the outer surface of each filter bag, a cleaning nozzle 32 connected to a source of compressed air (not illustrated) is directed axially into the upper open end of each filter bag 22. As the pressure within each bag increases, the bag flexes outwardly whereupon the dust deposits are detached from the outer surface of the filter bag and permitted to gravitate to the hopper 12. Collections of dust deposits are eventually removed through a removal gate 34 at the bottom of the hopper.

In accordance with this invention, an elongate inlet duct 36 extends transversely along the length of the hopper 12 from the inlet port 15 to the opposite wall. The inlet duct 36 is provided along its top side with an elongate outlet opening or slot 38 through which dust entrained gas is directed upward into the central portion of the filter chamber between banks of filter tubes where it may expand suddenly and lose much of its velocity. As the carrier gas loses velocity, it also loses the ability to entrain and carry particulate matter. Thus much of the particulate matter drops out of the carrier gas stream and falls to the bottom of the inlet duct 36 where a narrow slot 42 permits the particulate matter to fall therethrough to the hopper 12.

The slot 42 is much more restricted than the elongate top opening 38 whereby the gas stream in the inlet duct 36 will follow the path of least resistance and as a result flow freely upward to expand into the filter chamber, lose velocity and drop the heavier particulate matter carried thereby to the bottom of the duct 36.

The elongate top opening 38 is at the center of the inlet duct in the main housing section 10 intermediate banks of collecting filter bags 22. Thus, gas exhausting from the slot 38 rises through the central void between banks of filter bags and is turned laterally by the underside of the tube sheet 14. After the gas is turned laterally it circulates downward along the filter bags and eventually traverses the interstices between fibers thereof and deposits the fine particulate matter carried thereby on the surface of the filter bag. Thus, only gas free from entrained dust particles traverses the fabric filter and flows to the upper end of the filter bags and out through collar 18 to the clean gas outlet chamber and outlet duct 26.

As particulate matter collects on the outer surface of the filter bag it reduces the flow of dust entrained gas therethrough and must be periodically removed to permit the flow of said gas to continue. The particles collecting on the upstream surface of each bag are removed when a blast of compressed air from a predetermined source (not illustrated) is directed through the supply ducts 30 to the cleaning nozzle 32 and into the open end of each bag filter. The blast of compressed cleaning air momentarily reverses the flow through the filter, flexes the bag outwardly and breaks the collected dust cake from the outer surface thereof. As the dust cake falls down it is carried along to the collection hopper by the downward flowing air.

A perforate grating 40 above the elongate opening is welded or otherwise secured to upright plates 41 at the sides of the opening 38. The grating comprises a walkway for service and repair of the unit when the operations have been shut down, while it also comprises a permanent restriction to the dust-entrained air that exhausts through slot 38. The grating thus provides an even distribution of air throughout the bag filter chamber. However, it would be considered within the purview of this invention to provide a grating having graduated apertures designed to provide an even more constant distribution of fluid throughout the housing.

Thus while only a single form of the device has been disclosed in the drawing, it will be understood that various concepts defined herein may be applicable to other sizes and shapes of apparatus employed for the stated purpose. It is therefore to be understood that various changes may be made in the details of construction without departing from the spirit of the invention.

We claim:

1. Apparatus for separating particulate matter from a carrier gas compromising a housing, a dust hopper subjacent said housing and attached thereto, an inlet for dust entrained gas at one end of said hopper, an outlet for clean gas adjacent the upper side of said housing, an apertured tube sheet extending across said housing intermediate the inlet and outlet openings to separate the housing into filter and outlet chambers, duct means extending from the inlet end to the opposite end of said hopper to direct dust entrained gas therethrough, filter bags depending from said tube sheet at the sides of said duct means to provide an expansion chamber having a void, an elongate opening in the top of said duct means subjacent said void and adapted to exhaust the dust entrained gas vertically, and cleaning means adapted to remove collected dust particles from the outer surface of said filter bags and drop them to the subjacent collection hopper for removal from said apparatus said duct means having an opening at the bottom thereof to permit heavy particulate matter carried by said gas to fall directly into said hopper.

2. Apparatus for separating particulate matter from a gas as defined in claim 1 wherein the duct means extending from inlet to the opposite end of the hopper is cylindrical to preclude the accumulation of particulate matter in said duct means.

3. Apparatus for separating particulate matter from gas as defined in claim 2 wherein the opening at the bottom of the duct means comprises an elongate slot that permits the movement of particulate matter therethrough.

4. Apparatus for separating particulate matter from gas as defined in claim 3 wherein the opening along the top of the inlet duct has a greater area than the elongate slot at the bottom of said duct.

5. Apparatus for separating particulate matter from gas as defined in claim 1 including a perforate grating extending along the opening at the top of said duct means to provide a catwalk giving access to the filter bags of said apparatus and simultaneously restrict flow to establish a pressure differential between the inlet duct and the filter chamber.

* * * * *